United States Patent [19]

Benayoun et al.

[11] Patent Number: 5,771,227
[45] Date of Patent: Jun. 23, 1998

[54] METHOD AND SYSTEM FOR ROUTING MASSAGES IN A MULTI-NODE DATA COMMUNICATION NETWORK

[75] Inventors: Alain Benayoun, Cagnes sur Mer; Jean-Francois Le Pennec, Nice; Patrick Michel, La Gaude; Gerard Brun, Nice, all of France

[73] Assignee: International Business Machines Corporation, Armonk, N.Y.

[21] Appl. No.: 612,712

[22] Filed: Mar. 8, 1996

[30] Foreign Application Priority Data

Mar. 8, 1995 [EP] European Pat. Off. .............. 95480016

[51] Int. Cl.$^6$ .............................. H04J 3/24; H04L 12/56
[52] U.S. Cl. .......................... 370/235; 370/392; 370/396; 370/400; 395/182.02
[58] Field of Search .................................. 370/217, 218, 370/225, 228, 235, 236, 237, 254, 255, 389, 392, 395, 396, 400, 406, 407, 408, 410; 340/825.03, 826, 827, 825.52; 379/220, 221, 271, 272, 273; 395/181, 182.01, 182.02, 200.13, 200.15, 311, 421.11

[56] References Cited

U.S. PATENT DOCUMENTS

| | | | |
|---|---|---|---|
| 4,794,594 | 12/1988 | Picard ..................................... | 370/400 |
| 4,918,690 | 4/1990 | Markkula, Jr. et al. ................ | 370/400 |
| 4,939,726 | 7/1990 | Flammer et al. ....................... | 370/400 |
| 5,206,856 | 4/1993 | Chung ..................................... | 370/400 |
| 5,432,777 | 7/1995 | Le Boudec et al. .................... | 370/397 |
| 5,517,497 | 5/1996 | Le Boudec et al. .................... | 370/399 |

FOREIGN PATENT DOCUMENTS 0253940  6/1986  European Pat. Off. .

OTHER PUBLICATIONS

International Conference on Circuits and Computers, Oct. 1982 USA pp. 93–97 by K. Brayer "Survivable Computer Communication Routing Using Decentralized Control", p. 95, right column, line 1—p. 35, left column, line 32.

Primary Examiner—Alpus H. Hsu
Attorney, Agent, or Firm—Joscelyn G. Cockburn

[57] ABSTRACT

The invention relates to a method and a system for routing messages or frames through network nodes connected to each other by network links and connected to a plurality of terminals by different input/output ports also called network attachment cards (NAC) in a multi-node communication network. In such a configuration, each terminal equipment stores a network table. The network table is updated in the terminal itself by a network manager which may by the way limit the access of the terminal to some terminals of the network. To route an incoming message or frame from a source terminal (T1) to the destination terminal (T7), a routing algorithm is implemented in each NAC. Each NAC has a different and unique integer address in the node, each node has a different and unique prime number address greater than the number of NACs in the node. Each terminal connected to a node sends frames with a routing identifier (RI). The different RIs are located in the network table. When an input NAC receives a frame, the routing algorithm computes the address of the output NAC given by the remainder of the division of the RI by the node address, then this output NAC sends the frames onto its network link. This process is performed in each node until the destination terminal is reached. The RI is kept unchanged during the frame transmission. A timer is also used to test if the frame is received because a network link may be down. In such case, an alternate RI is used to take an alternate route.

16 Claims, 16 Drawing Sheets

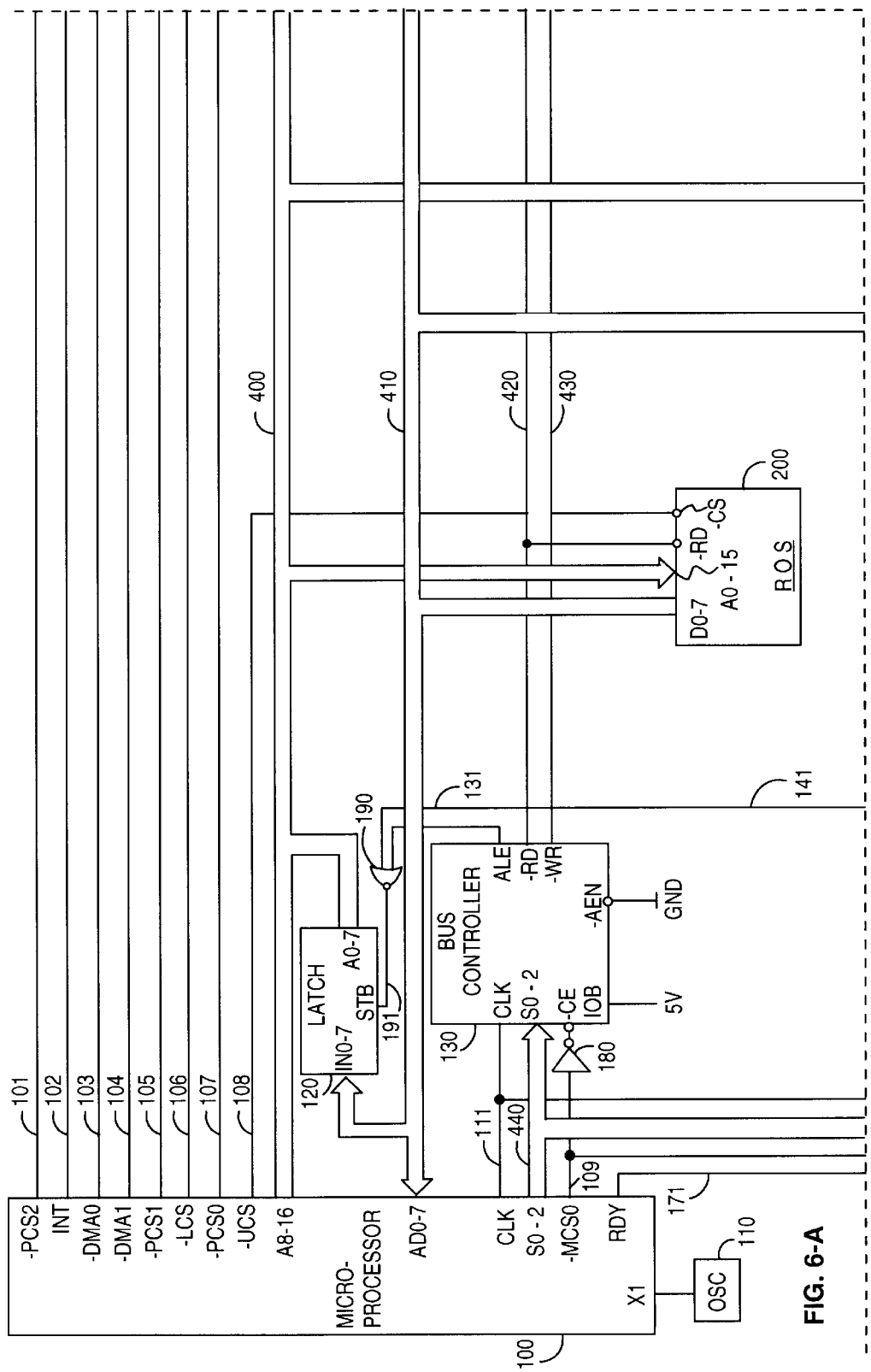
FIG. 6-A

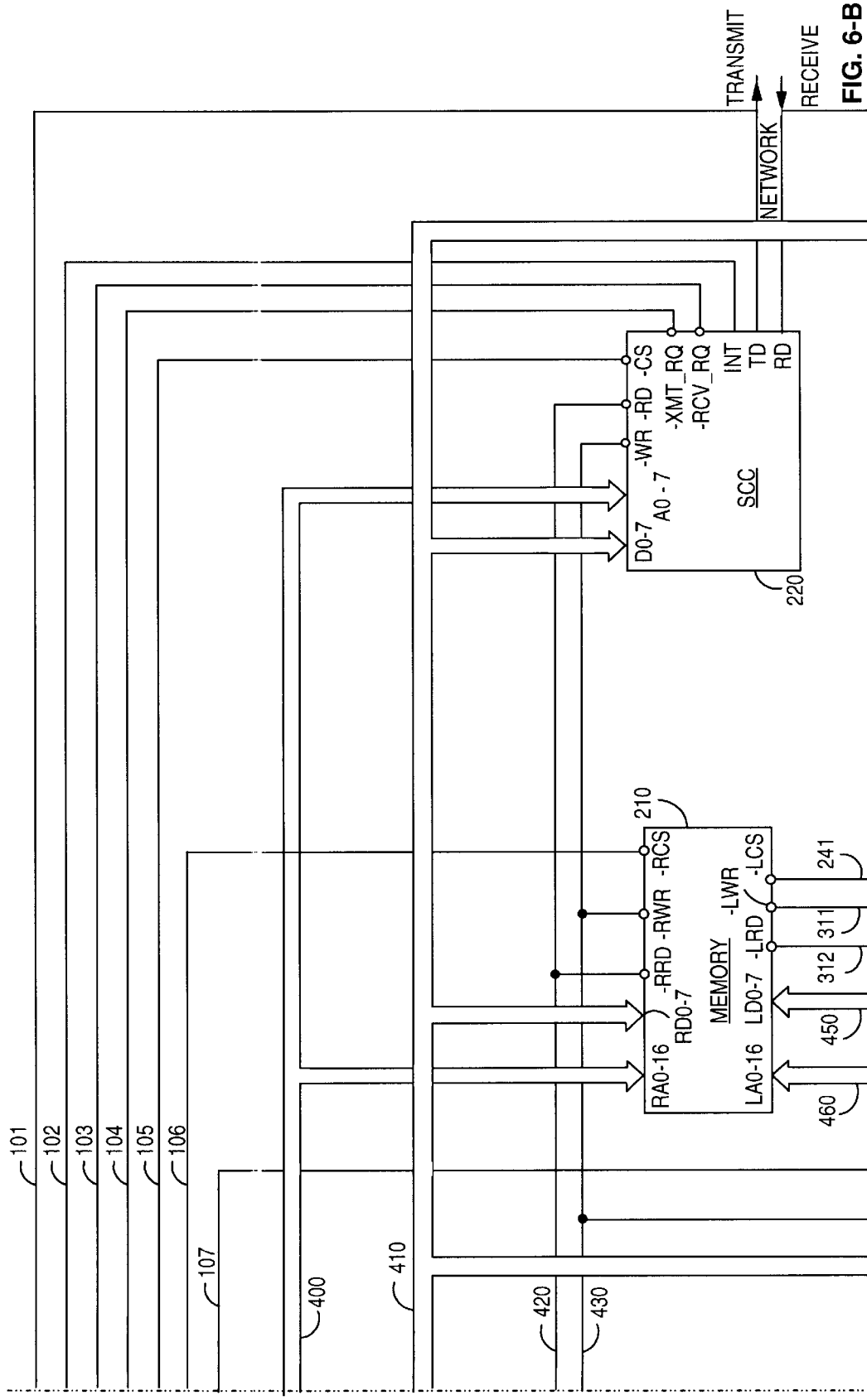

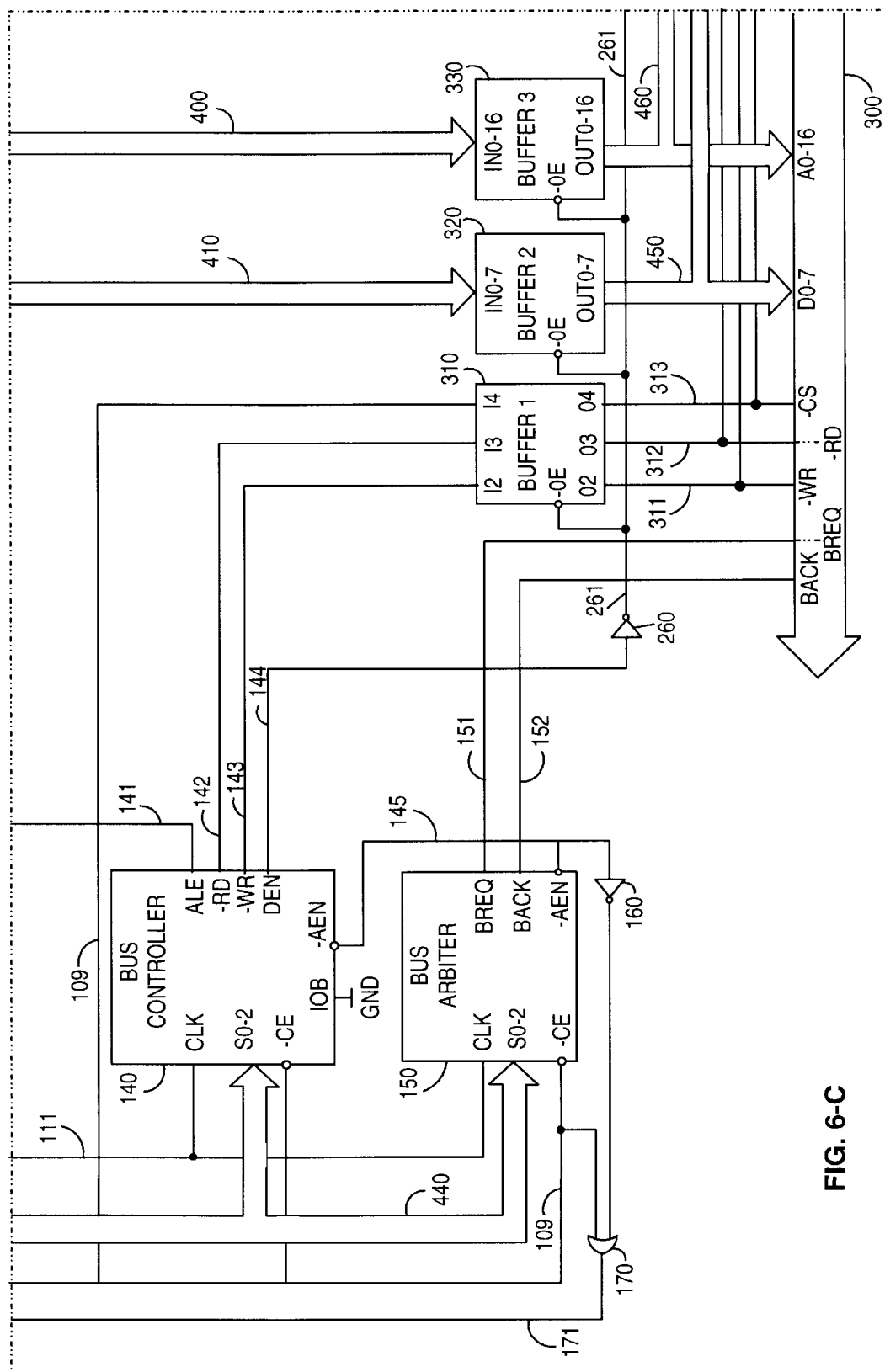
FIG. 6-C

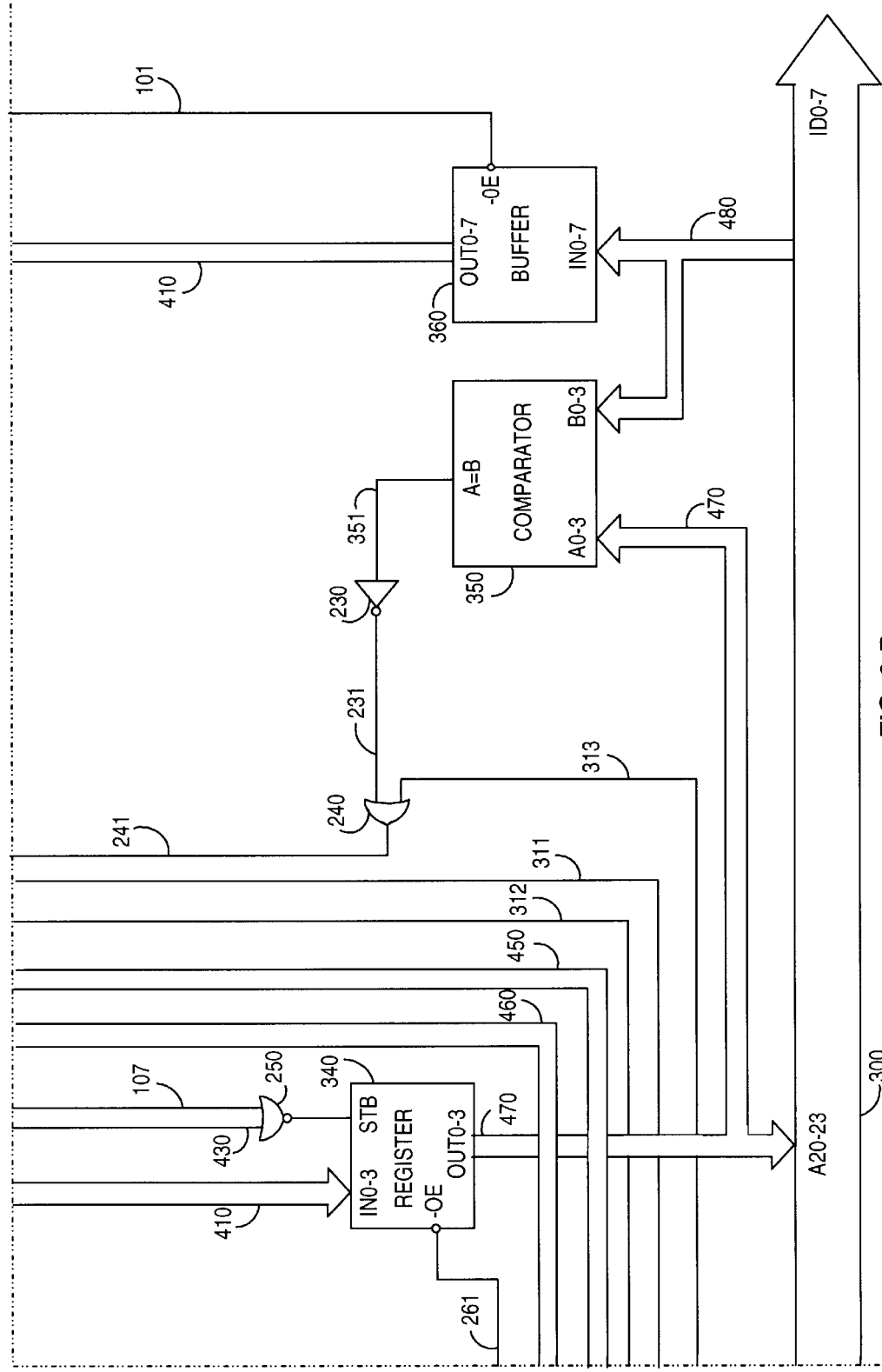
FIG. 6-D

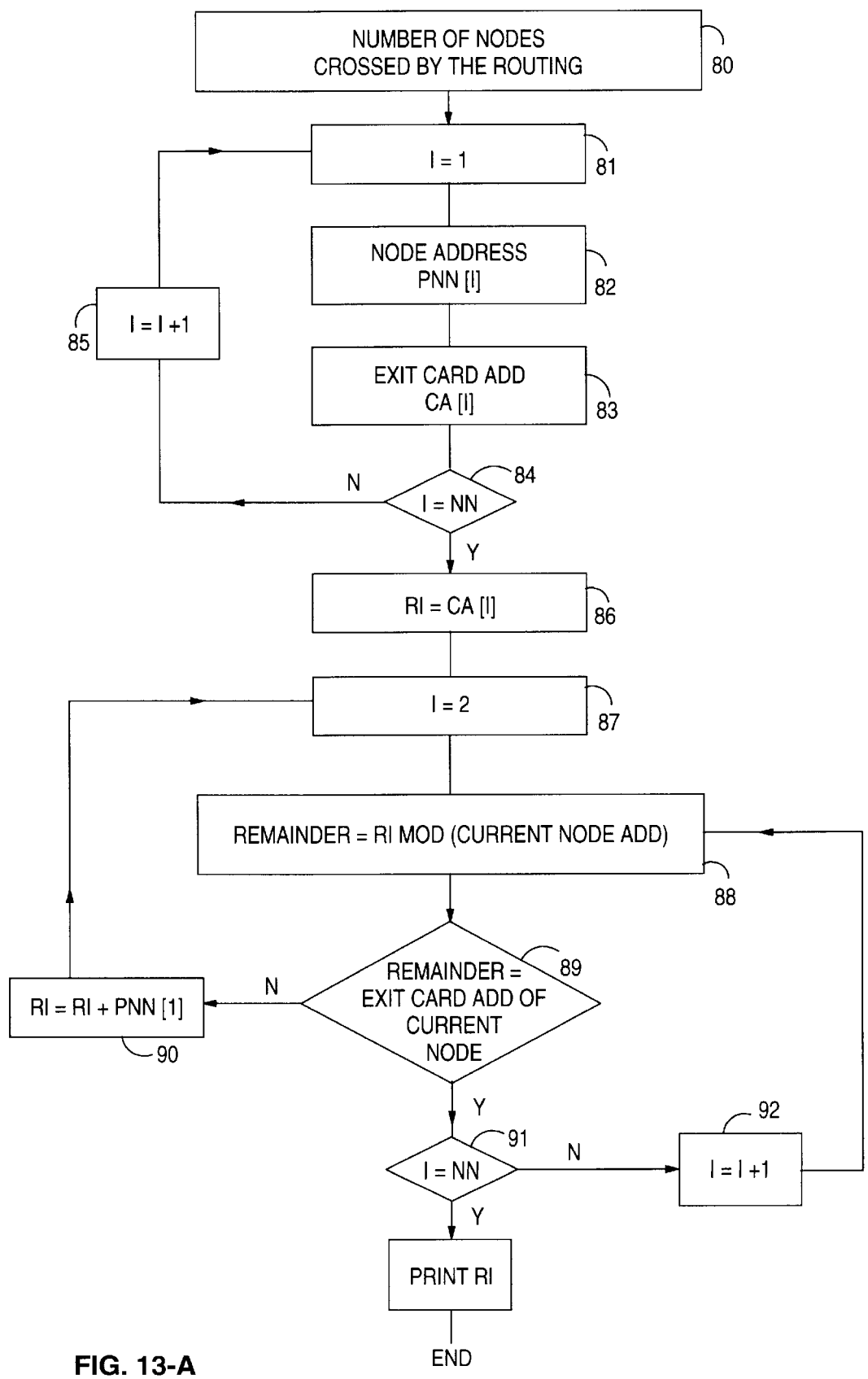
FIG. 13-A

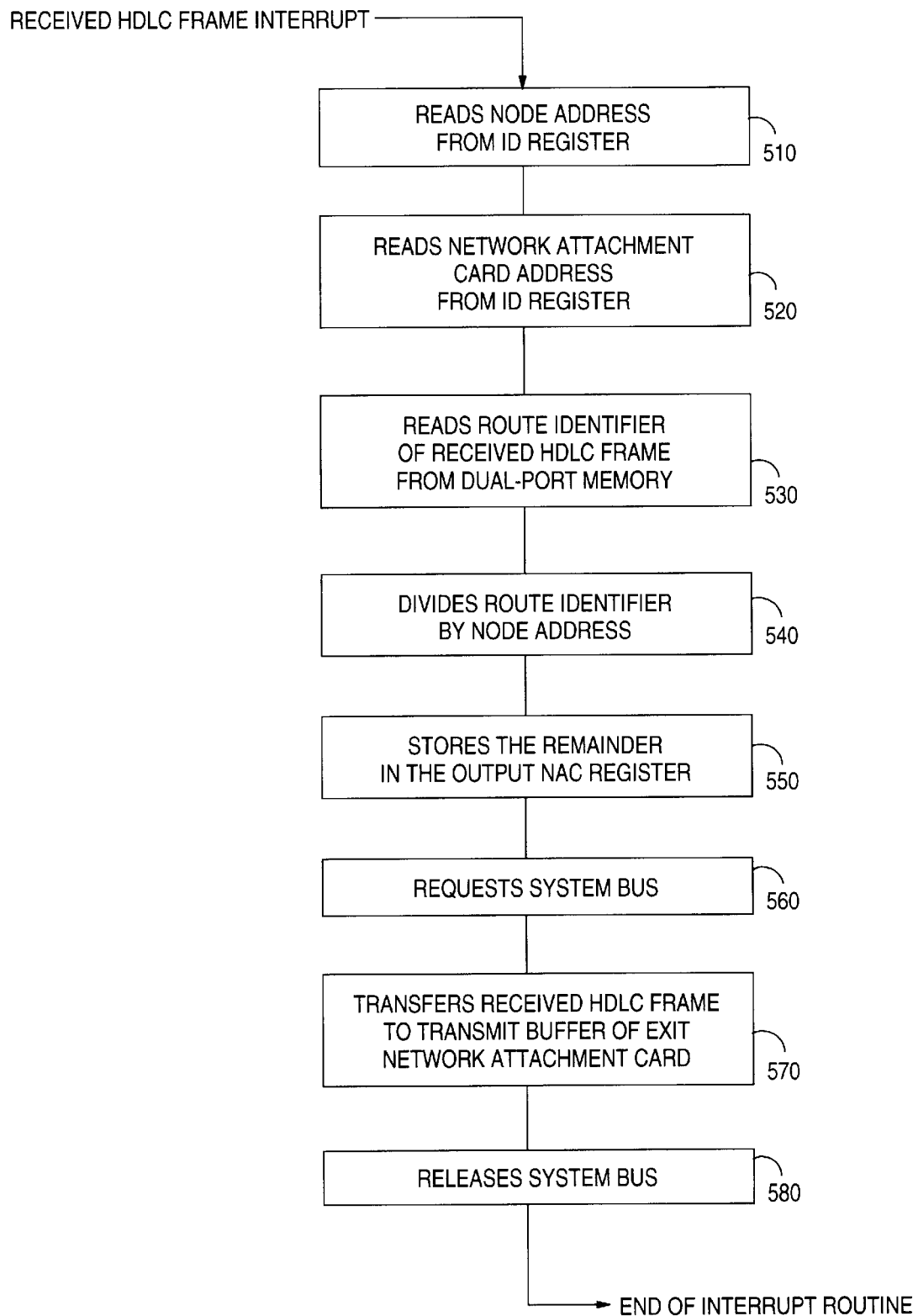
FIG. 13-B

|       | NODE 1 | NODE 2 | NODE 3 |
|-------|--------|--------|--------|
| NAC 1 | 0      | 1      | 0      |
| NAC 2 | 1      | 3      | 1      |
| NAC 3 | 2      | 0      | 4      |
| NAC 4 | 4      | 2      | 2      |
| NAC 5 | 5      | 4      | 3      |

FIG. 15

|                 |    | DESTINATION TERMINAL |         |         |           |           |           |           |            |          |
|-----------------|----|----------------------|---------|---------|-----------|-----------|-----------|-----------|------------|----------|
|                 |    | T1                   | T2      | T3      | T4        | T5        | T6        | T7        | T8         | T9       |
| SOURCE TERMINAL | T1 | - -                  | 1 -     | 2 -     | 18 550    | 44 121    | 70 693    | 69 850    | 134 486    | 4 213    |
|                 | T2 | 0 -                  | - -     | 2 -     | 18 550    | 44 121    | 70 693    | 69 850    | 134 486    | 4 213    |
|                 | T3 | 0 -                  | 1 -     | - -     | 18 550    | 44 121    | 70 693    | 69 850    | 134 486    | 4 213    |
|                 | T4 | 78 507               | 1 430   | 15 353  | - -       | 2 -       | 0 -       | 3 498     | 24 134     | 59 862   |
|                 | T5 | 78 507               | 1 430   | 15 353  | 4 -       | - -       | 0 -       | 3 498     | 24 134     | 59 862   |
|                 | T6 | 78 507               | 1 430   | 15 353  | 4 -       | 2 -       | - -       | 3 498     | 24 134     | 59 862   |
|                 | T7 | 78 715               | 1 638   | 67 561  | 11 837    | 44 408    | 0 980     | - -       | 2 -        | 4 -      |
|                 | T8 | 78 715               | 1 638   | 67 561  | 11 837    | 44 408    | 0 980     | 3 -       | - -        | 4 -      |
|                 | T9 | 78 715               | 1 638   | 67 561  | 11 837    | 44 408    | 0 980     | 3 -       | 2 -        | - -      |

DIRECT
ALTERNATE

METHOD AND SYSTEM FOR ROUTING MASSAGES IN A MULTI-NODE DATA COMMUNICATION NETWORK

TECHNICAL FIELD OF THE INVENTION

The present invention relates to a data communication system and more particularly to a method and a system for routing messages or frames in a multi-node data communication network.

BACKGROUND ART

In a data communication network wherein a great many network nodes are connected together, it is required to devise a node configuration which enables the different terminals or stations connected to those network nodes to communicate to each other, each network node being connected to a plurality of terminals or stations. The node configuration is necessary especially when new terminals have been added or disconnected from the communication system.

A data communication network is constituted by more or less intelligent nodes which have to be configured by means of network tables stored in the intelligent nodes. The addition of either a new node or a new terminal equipment requires an update of all the network nodes and temporarily stops the network activity, which may erode the throughput of the communication system.

FIG. 1 shows the implementation of a node in the prior art. In this type of environment, it is required that each network node uses a memory, a disk which stores a high volume of network data and more specifically the network tables, a diskette, a main processor running the node system software and different cards connected to the network lines. In such data network node architecture, each network link is connected to a card which is connected to an internal bus to communicate with the main processor and the other cards. In that prior art context, the network tables are to be updated in each node and it takes a lot of time. This delay will be all the longer as the communication network is important. Moreover, the use of very powerful processor in each node increases the cost of such implementation.

In a patent application EP A608653, a method and a system for routing information between nodes in a communication network are described. The invention is based on a routing code which is specific to each node. These routing codes of the successive nodes of the route through which the frame will pass, are then arranged to obtain a routing code list. At each node the frame is received, said node extracts from the routing list the routing code specific to said node to determine the output port address from the routing code and the input port address. But in that invention, the nodes are required to store specific network tables and this kind of code list or routing code is not used in the present invention. Further more, the addresses of the input/output ports and of the nodes are totally different from the present invention.

Therefore, there is a need to devise a system which avoids to implement disk and powerful processor in each node by removing the network table from each node. In this way, all the network nodes may operate transparently without having to be configured and to stop the activity of the network each time a terminal or a node is added to the communication system.

SUMMARY OF THE INVENTION

Thus, the present invention provides a system and a method which enable routing the frames within each node without using the network table but a specific routing algorithm. Thus, the network table is stored in each terminal attached to the node.

Besides, by avoiding to implement in each node a disk and a powerful processor, the cost of the data communication network node is thereby drastically reduced.

Moreover, the invention may be implemented in many communication networks such as HDLC networks, Frame Relay networks, ATM networks and any public or private networks.

More particularly, the invention implements a method and an apparatus for routing messages or frames through network nodes connected to each other by network links and connected to a plurality of terminals by different input/output ports also called network attachment cards (NAC) in a multi-node communication network. In such a configuration, each terminal equipment stores a network table. In this way, each node does not need to be re-configured by the addition of either a new node to the communication network or a new terminal to a node, since the transmission performance is not affected. The network table is updated in the terminal itself by a network manager which may by the way limit the access of the terminal to some terminals of the network. To route an incoming message or frame from a source terminal (T1) to the destination terminal (T7), a routing algorithm is implemented in each NAC. Each NAC has a different and unique integer address in the node, each node has a different and unique prime number address greater than the number of NACs in the node. Each terminal connected to a node sends frames with a routing identifier (RI). The different RIs are located in the network table. When an input NAC receives a frame, the routing algorithm computes the address of the output NAC given by the remainder of the division of the RI by the node address; then, this output NAC sends the frames onto its network link. This process is performed in each node until the destination terminal is reached. The RI is kept unchanged during the frame transmission. A timer is also used to test if the frame is received because a network link may be down. In such case, an alternate RI is used to forward the message through an alternate route.

BRIEF DESCRIPTION OF THE DRAWINGS

FIGS. 6-A, 6-B, 6-C and 6-D represent the schematics arrangement of the network attachment card (NAC) to be implemented in the communication node according to the present invention.

FIG. 13-A shows a method for computing the routing information in the network table.

FIG. 13-B represents a flow chart of the routing algorithm.

FIGS. 15 and 16 give an example of the network parameters and the table of route identifiers which gathers the network tables of all the terminals connected to the network in a configuration as shown in FIG. 4.

DETAILED DESCRIPTION OF THE PRESENT INVENTION

Figure 1:
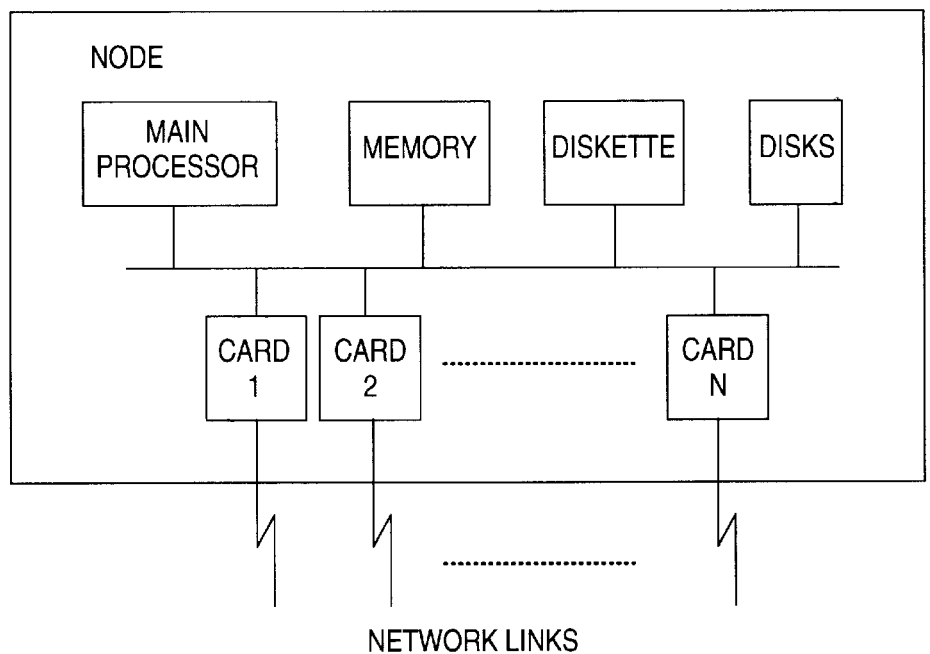
FIG. 1 shows the implementation of the different parts in a node in the prior art.
Figure 2:
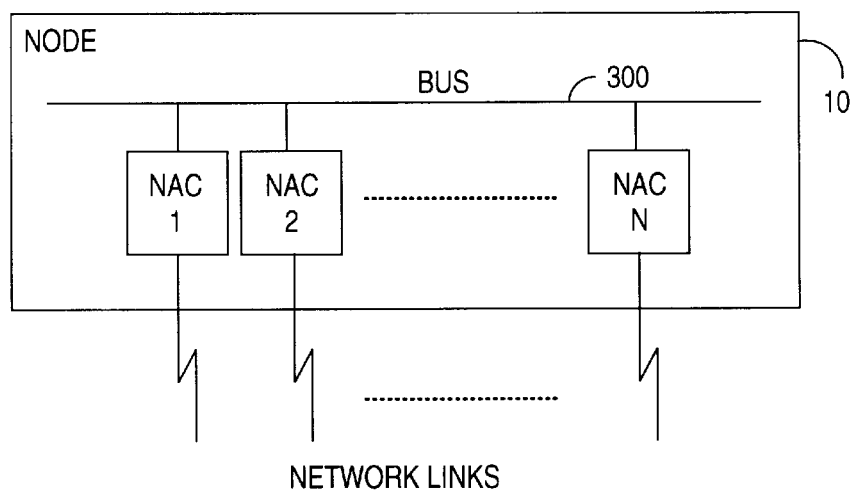
FIG. 2 shows the implementation of the different network attachment cards in a node according to the present invention.

The implementation of a node according to the present invention is shown in FIG. 2. Each network link is connected to a Network Attachment Card (NAC) which is also called input/output port which is connected to an internal system bus to transfer the data frames in a peer-to-peer communication mode, and each NAC has a routing algorithm to determine its peer address. The NACs are to be devised according to the present invention and are described in details in FIG. 3. But there is no main processor neither a main memory, disks nor diskette dedicated to the node as in the prior art.

Figure 3:
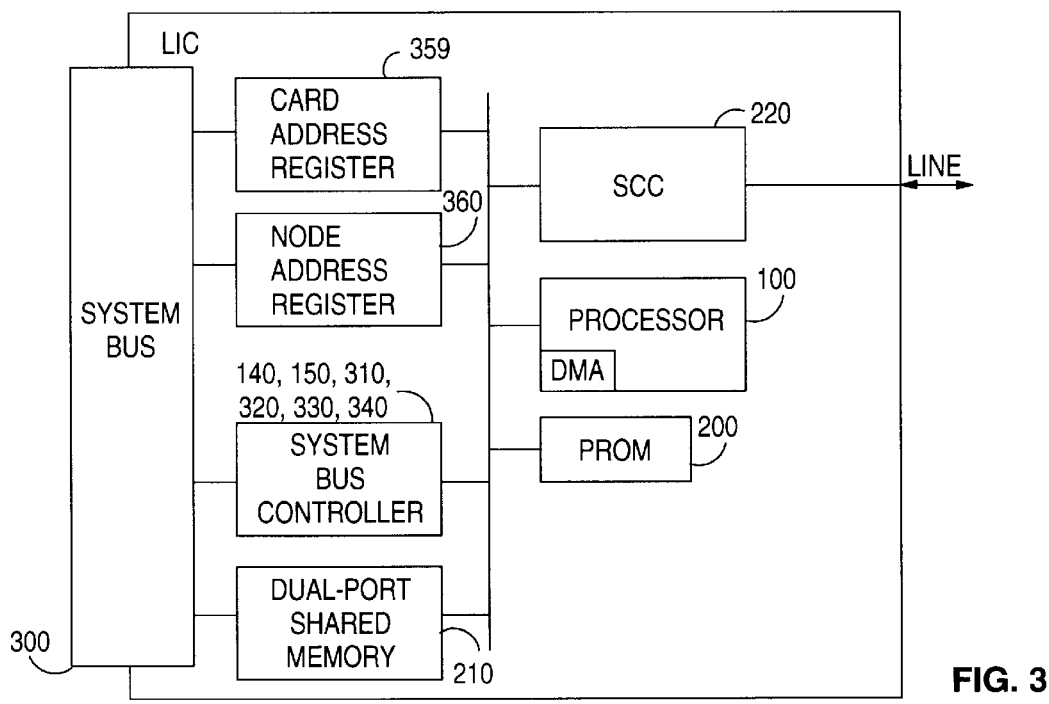
FIG. 3 represents a schematics bloc diagram of a network attachment card implemented in a node.

FIG. 3 shows a schematic bloc diagram of a network attachment card architecture. It comprises a card address register (5a), a node address register (360), a dual port memory (210) and a system bus controller (140, 150, 310, 320, 330, 340), all connected to a system bus (300). It further comprises a LED panel (not shown), a serial communication controller also called SCC chip (220) connected to a network electrical interface linked to the network line. A processor (100) is also implemented to control the NAC operations and data transfer through a direct memory access DMA. Its code is resident in a PROM (200) which is composed of the following microcodes: a power on self test (POST), the LED panel controller for maintenance, the data transfer between the memory (210) and the serial communication controller, the data transfer between two NACs using a peer-to-peer communication protocol and finally a routing algorithm.

The SCC chip controls the HDLC format and reports any frame error to the processor through its interrupt. The NAC reads respectively its card address and its node address from the enclosure backplane through its card address register (5a) and its node address register (360).

Figure 4:
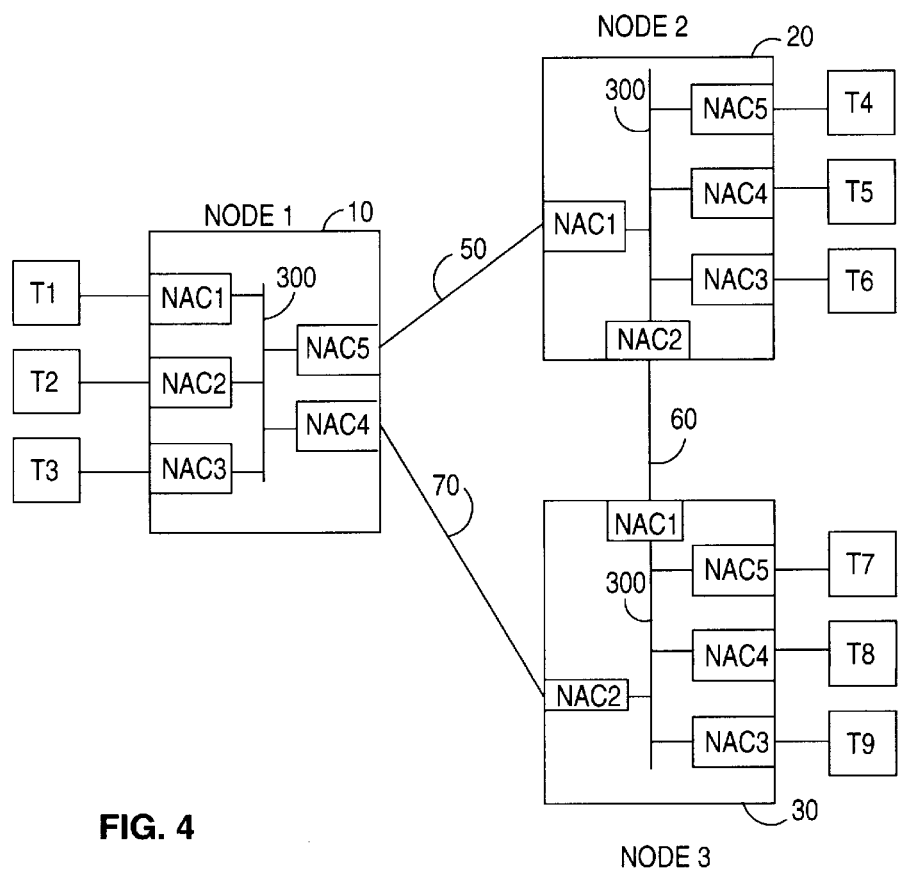
FIG. 4 represents a simplified data communication network according to the present invention.

FIG. 4 illustrates an example of a simplified data communication network composed of three nodes: node1 (10), node2 (20) and node3 (30), wherein each node is made of a plurality of Network Attachment Cards (NAC1 ... NAC5) connected together through the system bus (300) within the same node. In this example, a NAC may be connected to a terminal or to another node, for instance NAC1, NAC2 and NAC3 of node 1 (10) are respectively connected to terminals or stations T1, T2 and T3 whereas NAC5 and NAC4 are connected respectively connected to node2 (20) and node3 (30) through external network links (50) and (70). Node2 and node3 are built according to the same principle and connected together through an external network link (60). Node2 has for example five NACs which are respectively connected to node1 (10), node3 (30), terminals or stations T6, T5 and T4. Likewise, node3 is composed of five NACs which are respectively connected to node2 (20), node1 (10), terminals T9, T8 and T7.

Each network attachment card has a unique address as well as each network node. In this invention, no intelligent network node does require any network table to operate. Each node has a routing algorithm to find the destination route and the network tables are located in the terminals or stations T1 to T9 connected to the nodes as previously mentioned.

Each network attachment card is controlled by its own processor which runs the routing algorithm inside each network node. Each NAC will be described in more details in FIGS. 6-A to 6-D and the system bus is described in details in FIG. 7.

Hardware Description of the Network Attachment Card

Figure 5:
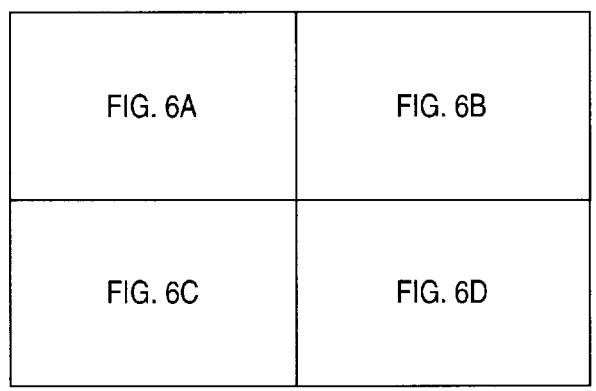
FIG. 5 shows the association for the schematic arrangement of the NAC shown in FIGS. 6-A through 6-D.

FIG. 5 shows the arrangement of FIGS. 6-A, 6-B, 6-C and 6-D which represent the hardware description of a NAC.

It should be kept in mind that the sign minus '–' before a signal means that the signal is activated when it is at its down level and deactivated when it is at its high level. For example, the operation of write is requested when the signal –WR is at its down level.

The network attachment is composed of a transmit line and a receive line. The transmit and receive lines are respectively connected to an output pin TD and an input pin RD of a serial communication controller (220), referred as an SCC chip. This SCC chip has an output pin INT carrying an interrupt signal which is connected through lead (102) to an interrupt pin INT of a microprocessor (100) of the type i80188. It further has an output pin –RCV_RQ carrying a receive_DMA_request signal which is connected through lead (103) to a pin –DMA0 of the microprocessor (100). Conversely, an output pin —XMT_RQ carrying a transmit_DMA_request signal is connected through lead (104) to a pin DMA1 of said microprocessor. The SCC chip also receives through lead (105) a peripheral_chip_select signal on its pin –CS from an output pin –PCS1 (peripheral chip select) of the microprocessor. Read and Write signals are respectively carried by leads (420 and 430) respectively connecting pins –RD and –WR of the SCC chip (220) to pins –RD and –WR of a first bus controller (130) of the type i8288. The data are carried by a bidirectional data bus, referred as bus (410) connecting pins D0–7 of the SCC chip (220) to a bidirectional multiplexed address/data bus pin AD0–7 of the microprocessor. This bus (410) is also connected to the input bus pin IN0–7 of a latch (120) of the type 74ALS273. This latch has also an output bus A0–7 which is connected to an input address bus A0–7 of the SCC chip. The output address bus A8–16 of the microprocessor (100) along with an output bus A0–7 of latch (120) enable to provide an internal 17-bit address bus (400) referred as A0–16.

A buffer (360) of the type 74ALS244 has an output bus OUT0–7 which is connected to said bus (410). Said buffer (360) is enabled by an output_enable signal received on its input pin –OE which is connected to an output pin –PCS2 (peripheral chip select) of the microprocessor (100) through lead (101). It also has an input IN0–7 which is connected through a bus (480) to an identification output bus ID0–7 of a system bus (300). The lower nibble ID0–3 of the system bus (300) is connected to the input port B0–3 of a comparator (350) of the type 74ALS85 whose other input port A0–3 is connected through a bus (470) to an output bus OUT0–3 of a register (340) of the type 74ALS373, said bus (470)

being also connected to an address input bus A20–23 of the system bus (300). The register (340) has an input bus IN0–3 which is connected to bus (410). Its strobe pin STB receives an output of a 2-input NOR gate (250) which receives a write signal through lead (430) and an address decode signal from pin –PCS0 (peripheral chip select) of the microprocessor through lead (107).

A Read Only Storage ROS (200) is used in the present invention. It has a data bus output D0–7 which is connected to bus (410) while its address input bus A0–15 is connected to bus (400). The ROS chip receives the read signal on its pin –RD through lead (420). Its chip_select input pin –CS is connected to pin –UCS (upper_chip_select) of the microprocessor (100) through lead (108).

A dual port memory (210) is implemented in the preferred embodiment of the present invention and left and right inputs and outputs. Its bidirectional right_data bus pins RD0–7 and right_address bus pins RA0–16 are respectively connected to data bus (410) and address bus (400). Its right_read input –RRD and right_write input –RWR are respectively connected to leads (420 and 430). Its right_chip_select input –RCS is connected to a lower_chip_select output pin –LSC of the microprocessor (100) through lead (106). Conversely, its bidirectional left_data bus LD0–7 is connected through bus (450) to both an output OUT0–7 of a buffer (320) of the type 74ALS244 and to a data input bus D0–7 of the system bus (300) whereas its left_address bus LA0–16 is connected through bus (460) to both an output OUT0–16 of a buffer (330) of the type 74ALS244 and to an address bus A0–16 of the system bus (300). Its left_read input –LRD is connected by lead (312) to both an output pin O3 of a buffer (310) of the type 74ALS244 and to a read pin –RD of the system bus, whereas its left_write input –LWR is connected by lead (311) to both an output pin O2 of said buffer (310) and to a write pin –WR of the system bus. Its left_chip_select input –LCS (lower chip select) is connected to an output of a 2-input OR gate (240) through lead (241) whose one of the inputs is connected to both an output O4 of buffer (310) and to a chip_select pin –CS of the system bus through lead (313) while the other input is connected to an output of an inverter (230) through lead (231). The input of said inverter (230) is connected to the output of comparator (350) through lead (351).

The bus input IN0–16 of buffer (330) and IN0–7 of buffer (320) are respectively connected to address bus (400) and data bus (410). Buffer (310) receives read and write signals respectively on its input pins I3 and I2 connected to output pins –RD and –WR of a bus controller (140) of the type i8288 through leads (142 and 143).

The system bus (300) has a bus_request pin BREQ and a bus_acknowledge pin BACK connected respectively to an output bus_request pin BREQ and to an input bus_acknowledge pin BACK of a bus arbiter (150) of the type i8289 through leads (151 and 152).

The microprocessor (100) has an output address decode pin –MCS0 (memory chip_select) connected to an input I4 of buffer (310), to an input of an inverter (180), to chip_enable input pins –CE of bus controller (140) and bus arbiter (150), and to one input of a 2-input OR gate (170) through lead (109). Said OR gate (170) has its other input connected to the output of an inverter (160) and outputs a not_ready signal to an input pin RDY of the microprocessor (100) through lead (171). The inverter (180) outputs a chip_select signal to a pin –CE of bus controller (130).

The bus arbiter (150) has an address_enable output –AEN connected to both the input of inverter (160) and to an address_enable input pin –AEN of bus controller (140) through lead (145). This latter has a data_enable output pin DEN connected through lead (144) to an input of an inverter (260) which outputs enable signals through lead (261) to output enable pins –OE of buffers (310, 320, 330) and register (340). The bus controller (140) further has an address_strobe output pin ALE connected to one input of a 2-input NOR gate (190) through lead (141), whose other input is connected to an address_strobe output pin ALE of bus controller (130) through lead (131). This NOR gate generates a strobe output signal to an input pin STB of latch (120) through lead (191).

Referring back to bus controller (140), it further has an I/O input pin IOB connected to the ground to program said bus controller in system bus mode, while the input IOB of bus controller (130) is connected to +5V to program it in local mode as does its address_enable input pin –AEN.

An oscillator (110) is required to generate free-running clock signals to an input X1 of microprocessor (100) which outputs then clock signals to input pins CLK of bus controllers (130 and 140) and bus arbiter (150) through lead (111). Conversely, the microprocessor has an output status bus S0–2 connected to both input status bus S0–2 of bus controllers (130 and 140) and bus arbiter (150) through bus (440).

Figure 7:
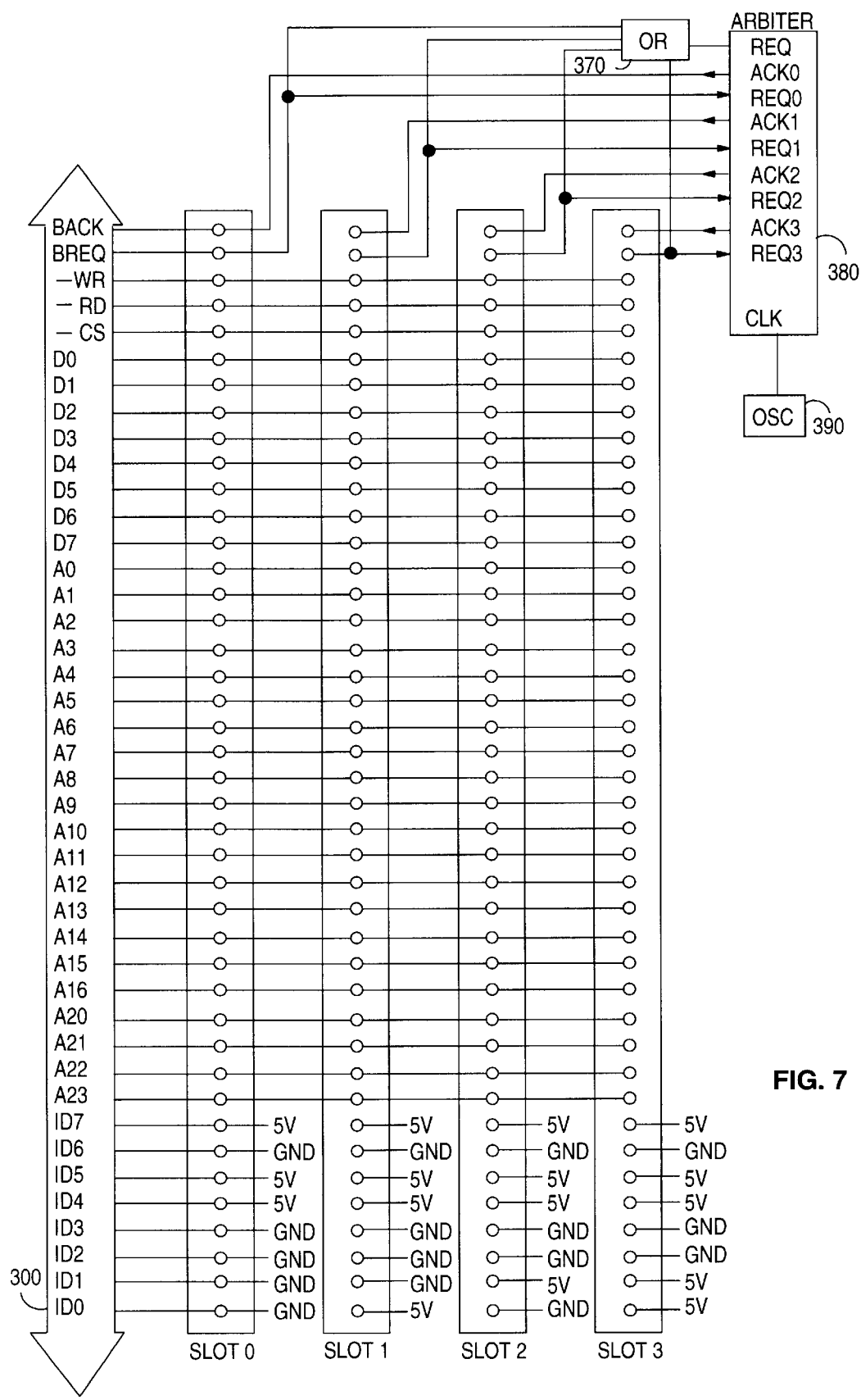
FIG. 7 shows the implementation of the system bus connecting the different NACs in each node.

FIG. 7 illustrates in detail the system bus (300) as mentioned above. This bus is physically the backplane of the network node and is composed of connectors and a bus arbitration logic. This figure describes a backplane for the installation of up to 4 network attachment cards, but one must acknowledge that the number of NACs may be higher or lower as well.

Each slot connector (slots 0 to 3) is composed of a data bus D0–7, two address busses A0–16 and A20–23, a read and write leads –RD and –WR, a chip_select lead –CS, a bus_request lead BREQ, a bus acknowledge lead BACK and an identification bus ID0–7, according to the above description.

Each slot connector has a unique identification bus ID0–7 value, the identification number may comprise more than 8 bits. The lower nibble ID0–3 is hardwired with the slot number while the higher nibble ID4–7 is hardwired with the node address. In our example the node address is equal to 11 in decimal while the slot addresses (slots 0 to 3) are equal to 0,1,2,3. The way the node addresses and the slot addresses are chosen will be explained later on.

The bus_request pin BREQ of slot connector 0 is connected to both the input bus_request pin REQ0 of an arbiter (380) and to one input of a 4-input OR gate (370). Conversely, slot connectors 1, 2 and 3 are connected to input bus_request pins REQ1, REQ2 and REQ3 of the arbiter (380) and to the other inputs of OR gate (370) which outputs a request signal to arbiter on its pin REQ.

In the same way, the bus_acknowledge pin BACK of slot connecter 0 is connected to the bus_acknowledge pin ACK0 of arbiter (380). So are the pins BACK of slot connectors 1, 2 and 3 to pins ACK1, ACK2 and ACK3 of the arbiter (380) which receives a free-running clock from an oscillator (390).

The arbiter (380) is a state machine which will be described in detail in FIG. 8 at the end of the description.

Functional Description of the Invention

Figures 11, 12:
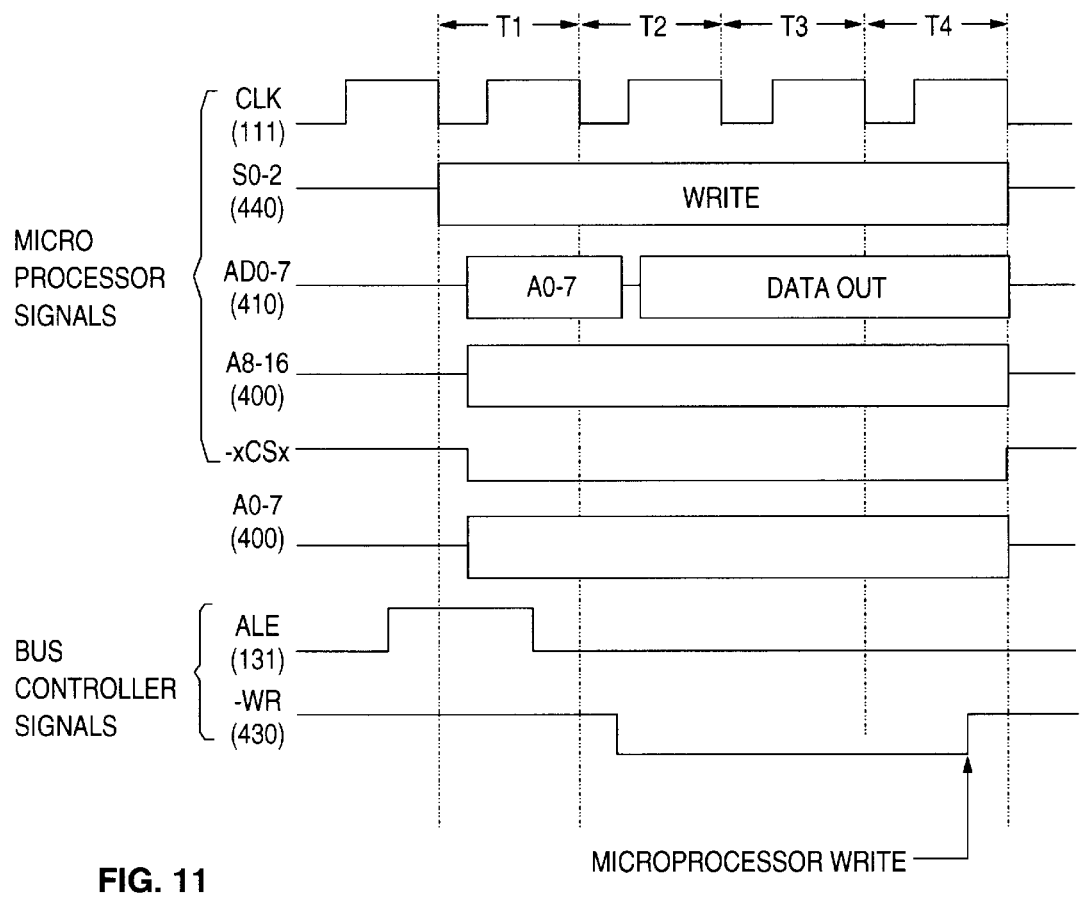
FIG. 11 shows a Write timing of the microprocessor used in each NAC towards on board I/Os.
FIG. 12 shows the frame formats issued by a terminal.

It must be kept in mind that the principle objectives of the present invention is to route an incoming frame to the right destination. For this purpose three considerations are essential for the implementation of the preferred embodiment:

i/ Each data network node has a unique address called node address. This address is a prime number 3, 5, 7, etc. . . . This number has to be greater than the highest address of network attachment cards (NACs) used in the node.

ii/ Each network attachment card in the node has a unique address which are different integers numbered for example from 0, 1, 4, 5 etc. . . . The numbers are not required to be successive.

iii/ Each terminal connected to a node sends HDLC frames with a Routing Identifier information (RI). This RI is the first byte of the frame and is never modified during the transmission. Each time a new terminal is connected to the network, a new RI is added to the network table of the terminal. The frames are described in detail in FIG. 12.

Figure 8:
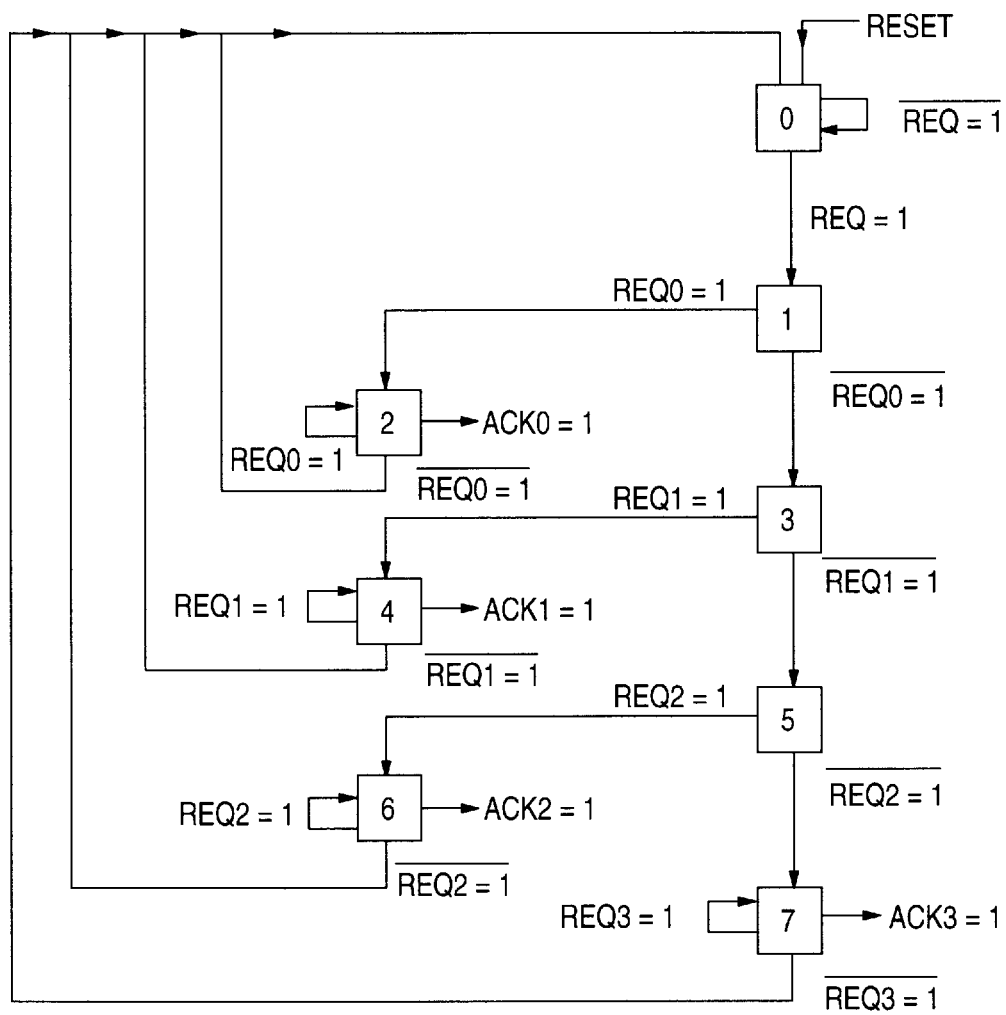
FIG. 8 shows the functional description of the arbiter of the system bus.

In order to understand how the network attachment card receives an incoming HDLC frame from a terminal and how the different components described in the hardware description operate, it is necessary to refer to FIG. 8 and also to the timing diagrams of FIGS. 10–12 and 15.

The heart of the network attachment card is the microprocessor (100) that controls the SCC chip (220), the dual port memory (210), the ROS chip (200), the ID register (360), the NAC output register (340) and the system bus (300). All the components are memory mapped within the microprocessor address range, an example of which is given in FIG. 9 at the end of the description.

The functional description of the present invention can be divided into three major steps, firstly a frame is received from the network by the SCC chip (220) and is stored into the dual port memory (210) (also called memory), secondly the frame is transferred from this memory to the memory of another card and finally from this latter, the frame is transferred to the SCC chip (220) for the transmission to the network line.

Step I/ Reception of a frame by the SCC chip to be transferred to the memory

The HDLC frame is received by the SCC chip (220) on its receive_data pin –RD. After several bytes received, the SCC chip activates its receive_DAM request signal on lead (103) to inform the microprocessor (100) of the reception of the bytes which are then available in the receive_byte FIFO. The READ and WRITE operations are described later on, the first being dedicated to the SCC chip while the second is dedicated to the memory.

Figure 10:
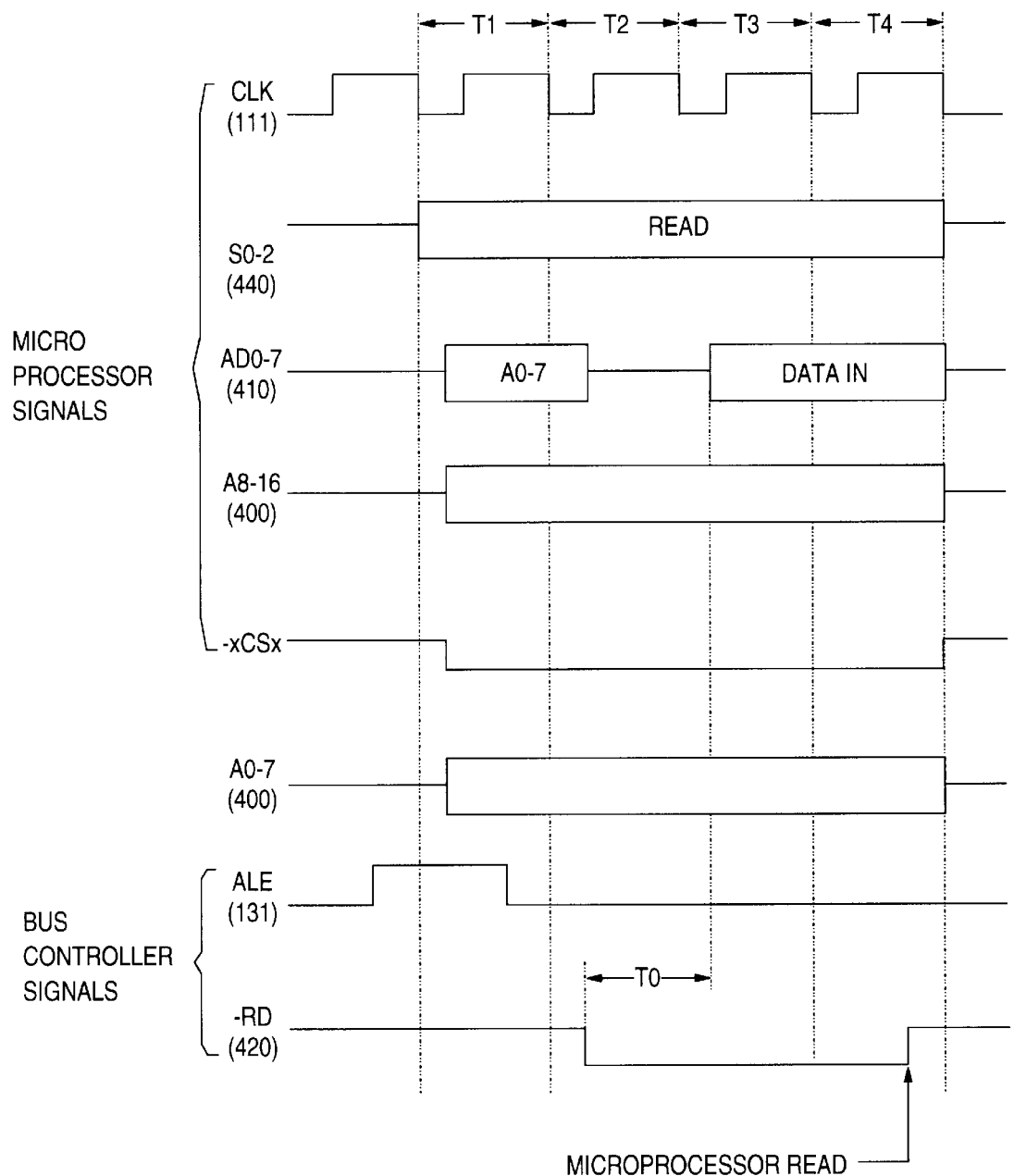
FIG. 10 shows a Read timing of the microprocessor used in each NAC towards on board I/Os.

The microprocessor starts a DMA READ OPERATION towards the SCC chip according to the read timing as described in FIG. 10. It activates the status bus S0–2 for a read operation and puts the address of the receive bytes FIFO onto the address busses AD0–7 and A8–16. Along with this address, the peripheral_chip_select signal to the SCC_chip is activated on lead (105). The status bus S0–2 is received by both the bus controllers (130,140) and the bus arbiter (150), but only bus controller (130) is selected. This is achieved because bus controller (130) receives through the inverter (180) the system_bus_memory_chip_enable signal on lead (109) which is not activated by microprocessor (100). The multiplexed address data bus referred as AD0–7 remains on the bus for a clock period. During that time, bus controller (130) activates the address strobe signal ALE on lead (131) and the read signal –RD on lead (420). The address of the receive_byte FIFO is latched into latch (120) on the falling edge of the strobe signal through the NOR gate (190). Thus, the SCC chip receives a steady address on its address bus (400) during the read cycle. The SCC chip only uses the eight lowest bits of the address bus (400). On the detection of the peripheral_chip_select signal on lead (105) and the Read signal on lead (420), the SCC chip (220) outputs the contents of its internal receive_byte FIFO on data bus (410). The data are then read by the microprocessor on the rising edge of the read signal on lead (420).

The read operation is then completed and microprocessor (100) deactivates its status bus S0–2 and removes the address of the receive_byte FIFO which in turn deactivates the peripheral_chip_select signal lead (105) received by the SCC chip (220). The first received byte is temporarily stored in the microprocessor (100) before it is transferred to the memory.

The WRITE OPERATION may now start and is performed by the microprocessor towards the dual-port memory where the received bytes are stored in a receive buffer. The write timing is described according to FIG. 11.

For this purpose, microprocessor activates the status bus S0–2 (440) for a write operation and puts the address of the receive buffer of the memory (210) on the address busses AD0–7 and A8–16. Along with this address, the lower_chip_select signal is activated on lead (106).

As during the read operation, only bus controller (130) has its chip_enable pin –CE activated through inverter (180). Therefore, it decodes the status bus S0–2 from bus (440) and activates both the address_strobe signal ALE on lead (131) and the write signal –WR on lead (430). As is previously mentioned, the lower address of the receive buffer of the memory (210) is latched into latch (120) on the falling edge of the address_strobe signal as the NOR gate (190) is connected upward its strobe pin. Therefore, the memory (210) receives a steady address bus (400) on its right_address pin RA0–16.

As the memory receives the active lower_chip_select signal on lead (106), the content of the data bus (410) is stored on the rising edge of the write signal on lead (430).

The write operation is then completed, microprocessor (100) deactivates its status bus S0–2 (440) and removes the receive buffer address which in turn deactivates the lower_chip_select signal received by the memory (210) on lead (106).

The READ and WRITE operations take place as long as the data bytes are received by the SCC chip (220). At the end of the HDLC frame reception, the SCC chip generates an interrupt signal on lead (102). Microprocessor detects this interrupt signal, reads the interrupt status register of the SCC chip and is informed then that a frame has been received and is available in the receive buffer of the memory. Then microprocessor runs the routing algorithm to find the address of the exit NAC to which the frame has to be transmitted.

The ROUTING ALGORITHM is based on node and NAC addresses, and on the network table located in the terminal.

Each node has a unique address called node address which is a prime integer (3, 5, 7, 11 . . . ) which is to be greater than the number of NACs used on the node. And each NAC in the node has also a unique address which is an integer (0, 1, 2, . . . ). The terminal connected to the node does not have any address but the HDLC frames sent from each terminal has a specific format. Each HDLC frame includes a Route Identifier header (RI) contained in the network table and is of several bytes as is described in FIG. 12. As is shown in this FIG. 12, the data bytes are provided at the application level to which is added the RI ahead at the SCC level. Finally, at the transmission level, the frame is constituted of a flag, a RI, bytes of data and a CRC (Cyclic Redundancy Checker), the flag and the CRC being automatically added by the SCC chip.

The various route identifiers are available in the network table located in each terminal. The network tables are built in the terminal according to a computation program handled by a network manager whose principle task is to manage the network configuration: each time a terminal is added or disconnected to/from the network through a node, the network manager has to determine the different terminals accessible by the new terminal. As the manager has a global view of the communication network, it can define the route from a source terminal to a destination terminal by solving the following equation:

RI Mod(node address)=Exit NAC Address

In the same way, each time the network is modified through addition/cancellation of terminals and/or network nodes, the network manager updates all impacted network tables.

FIG. 13-A provides an example to solve the equation. In this particular method of way of solving the equation, the network manager has to enter the parameters required by the program.

There are three types of parameters: the number of nodes the route comes across between the source terminal and the destination terminal, the node address and the exit NAC address for each node on the route.

More in detail, at step 80, the number of nodes between the source and destination terminals is required. At each node, the network manager has to define the node address, at step (82), and the exit NAC address at step (83). For this purpose, an iteration is to be done thanks to the increment of an integer I, done at step (85), this integer varies from I=1 to the number of nodes this route comes across, steps (81,85). When this integer I reaches the number of nodes, step (84), then the routing identifier RI is set by default to the exit card address of the first node at step (86).

Afterwards, the program computes the routing identifiers RI corresponding to the destination terminal according to the routing chosen by the network manager by iteration from the next node following the node attached to the source terminal to the last node attached to the destination terminal. Thus, an integer I is set equal to 2 at step (87) and is successively incremented. At step (88), the Remainder is determined by the remainder of the division of RI by the current node address. The Remainder is then tested at step (89) if it is equal to exit card address of the current node. If it is different, then RI is set equal to RI+(first node address) at step (90) and the program loops back to step (87). Otherwise, before the integer I is incremented at step (92), the program tests if I has reached the number of nodes at step (91). If the number of nodes is not reached, I is incremented at step (92) to examine the next node in the route at step (88). If I is equal to the number of nodes, which means that we are at the end of the route, then program may end by printing the routing identifier RI corresponding to the destination terminal according to the route defined by the network manager.

For instance, to compute the RI corresponding to the direct route from terminal T3 of node 1 to terminal T4 of node 2, it is required to enter the number of nodes which is equal to 2, the address of the node1 which is equal to 13, and the address of the exit NAC which is equal to 5. Then the equation RImod(13)=5 implies RI=18. By the way, it should be noted that this computation algorithm can be run by the network manager outside the network.

In this particular implementation, the network tables are made of two kinds of RI: a RI for a direct route and a RI for an alternate route, but the network table may contain additional alternate routing identifiers which correspond to the different routes. The three parameters corresponding to the those different routes are then entered in the program.

FIG. 13-B shows how the routing algorithm is used in the NAC. The terminal sends a HDLC frame with the direct RI to its attached NAC and starts a timer. Once the frame is stored in a receive buffer of memory (210), microprocessor (100) of the NAC receives the SCC interrupt and performs the following steps:

It reads its node address and its network attachment card address from the identification register in blocks (510) and (520). Afterwards, the route identifier of the received HDLC frame is read from the dual port memory in block (530); and the route identifier is divided by the node address in block (540). In block (550), the remainder of such division gives then the address of an exit NAC which has to receive the frame in the node and the remainder is stored in the exit NAC register. To transmit the frame, the system bus is requested in block 560; and in block 570, the received frame located in the receive buffer of the entry NAC is transferred to the transmit buffer of the exit NAC through the system bus (300). The system bus is afterwards released in block 580, which terminates the interrupt routine.

Finally, the exit NAC sends the frame through its SCC chip onto the network link without any change of the route identifier. This mechanism takes place until the HDLC frame is received by the destination terminal. Then the latter has to respond by sending back an acknowledgement frame. In case no acknowledgement frame is received before the expiration of the timer, the source or initial terminal knows that a network link is down between the sender and the destination terminal. Therefore, the source terminal resends the frame with the alternate RI for an alternate route.

The node address and the NAC address are hardwired on the backplane of the node at the connector level. The identification bus ID0–7 (480) provides the node address on the higher nibble ID4–7 and the NAC address on the lower nibble ID0–3.

The identification byte ID0–7 is read by microprocessor (100) through register (360) whose content is transmitted onto bus (410) when it receives a peripheral_chip_select signal on lead (101) from said microprocessor. The route identifier is then divided by the node address and the remainder of the division is transmitted by the microprocessor on bus (410) and stored in register (340) on the falling edge of the signal received on its strobe pin which occurs on the rising edge of the write signal received from bus controller (130) on lead (430) and on the activation of a peripheral_chip_select signal received from the microprocessor on lead (107). The register (340) is loaded then with the address of the exit NAC to which the HDLC frame has to be transferred.

Therefore, the second step takes place to transfer the frame from the first memory of the first NAC to the second memory of the second NAC.

Step II/ From memory to another memory (NAC-to-NAC)

Figure 14:
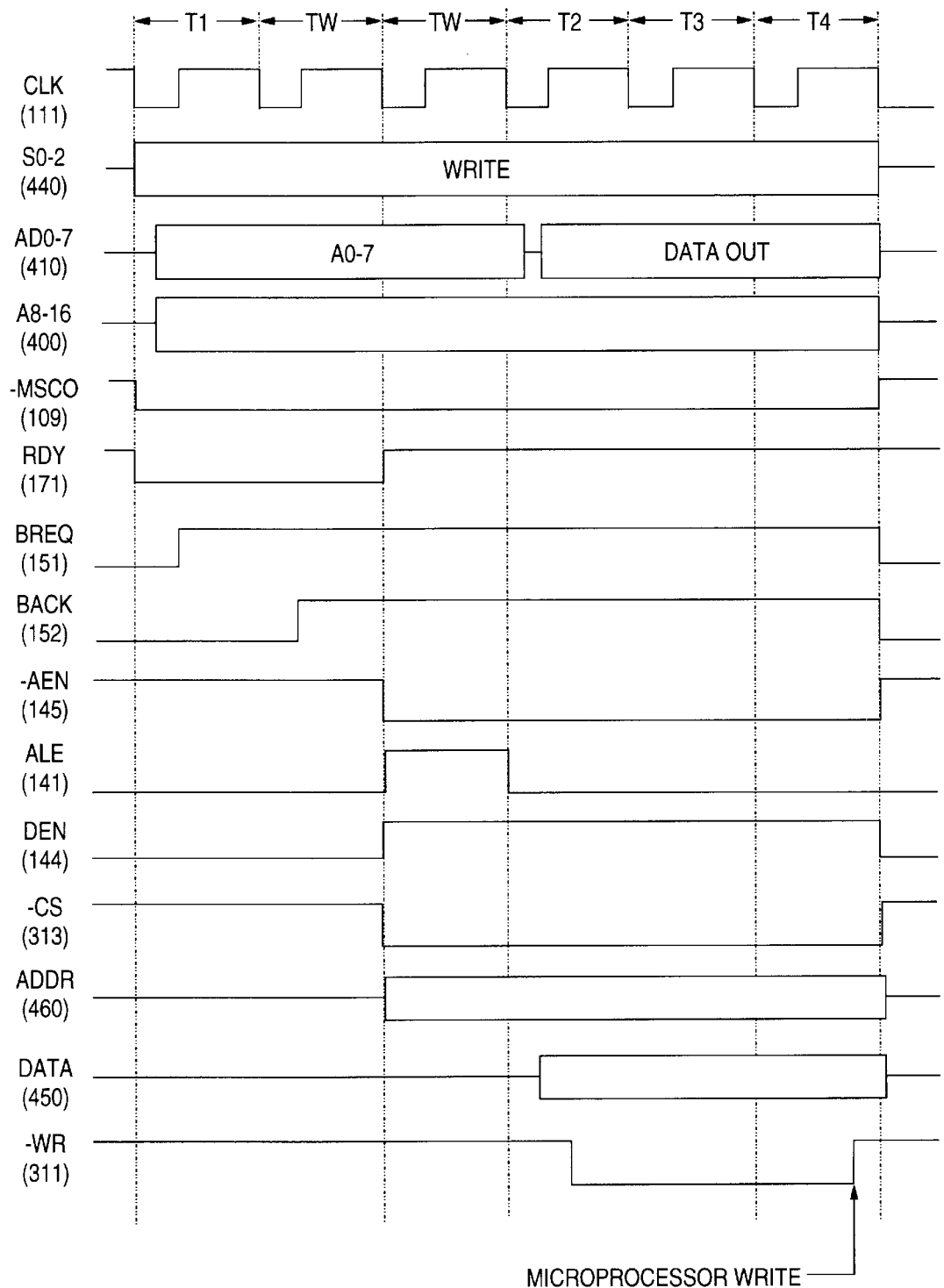
FIG. 14 shows the microprocessor Write timing diagram through the system bus.

The NAC-to-NAC transfer is performed by microprocessor (100) through successive read/write operations in the memory. The read operations apply to the on-board memory using the lower_chip_select signal on lead (106), whereas the write operations apply to the memory of the exit (or destination) NAC through the system bus (300) and using the system_bus_memory_chip_select signal on lead (109), as described later in FIG. 14.

For the write operation on the system bus (300) microprocessor (100) activates the status bus S0–2 (440) and puts the address of the transmit buffer of the memory onto busses AD0–7 and A8–16 which in turn activates the system_bus_ memory chip_select signal referred as –MCS0 on lead (109). The activation of the –MCS0 signal disables bus controller (130) through inverter (180), enables bus arbiter (150) and bus controller (140), and activates the microprocessor not_ready signal on lead (171) through OR gate (170).

The bus arbiter (150) is to control the access to system bus (300) whereas the bus controller (140) is to generate the write timing when bus arbiter allows it by generating an address_enable signal on lead (145). As the bus arbiter has received a memory_chip_select signal on lead (109), it activates the output bus_request signal on lead (151) onto the system bus.

The system bus arbiter logic is composed of the state machine (380), the clock oscillator (390) and the OR gate (370) which detects the activation of a bus_request signal. If the system bus is available, state machine (380) activates a bus acknowledge signal which is then transmitted on lead (152) to bus arbiter (150). If many bus_requests are activated at the same time, the system is granted to the requester which has the highest priority. Once bus arbiter (150) detects the bus acknowledge signal, it activates its output address_enable signal on lead (145) which allows bus controller (140) to generate the write timing signals and deactivates the not_ready signal to microprocessor (100).

Bus controller (140) decodes the status bus S0–2 and activates respectively the address strobe signal, the write signal and the data_enable signal on leads (141,143,144). The lower address byte of the memory transmit buffer is then latched into latch (120) on the rising edge of the address strobe signal it receives on lead (191) through the NOR gate (190). The activation of the data_enable signal on lead (144) enables through inverter (260) the buffers (310,320, 330) and register (340) dedicated to the system bus.

Once the register (340) is enabled, the address of the exit NAC is transmitted onto the address bus (470) and the system bus (300). Conversely, buffers (330,320) transmit respectively the address of the memory transmit buffer onto bus (460) and system bus (300) and the data byte to be stored in the memory transmit buffer onto bus (450) and the system bus (300). Besides, buffer (310) respectively transmits the chip_enable signal received from the microprocessor and the write signal received from bus controller (140) to system bus (300) on leads (313,311).

All these signals are received by each NAC of the node. The goal of comparator (350) is to select which NAC is addressed by the microprocessor. One port of the comparator connected to the lower identification nibbled ID0–3 of system bus (300) carries the source NAC address, while the other port connected to the address bus (470) carries the address of the exit NAC address to be accessed by the microprocessor. When both addresses are equal, the output of comparator on lead (351) is activated and the memory receives a left_chip_select signal on lead (241). The contents of the left_data_bus LD0–7 is then stored on the rising edge of the left_write signal received on lead (311).

Once the write operation is completed, microprocessor (100) deactivates status bus S0–2 (440) and removes the address of the transmit buffer which in turn deactivates the memory chip_select signal on lead (109). Therefore, bus controller (140) and bus arbiter (150) are no longer enabled. The bus controller deactivates the data_enable signal on lead (144), and the bus arbiter deactivates the bus_request and the address_enable signals on leads (151,145). As the bus_request signal is no longer activated on system bus (300), the bus acknowledge signal is deactivated by the state machine (380).

At this time, the HDLC frame is stored in the transmit buffer of the memory (210) located in the exit NAC. Therefore, the third step handled is to transmit this HDLC frame from this memory to the network link through the SCC chip located in this exit NAC.

Step III/ From the memory to the SCC chip

By setting a bit in the "SCC control register", Microprocessor (100) informs SCC chip (220) that a frame is available in the transmit buffer of the memory for the transmission. In response, the SCC chip activates its transmit_DMA_request signal on lead (104) and successive read/write operations are initiated. The read operations apply to the memory while the write operations apply to the SCC chip.

This microprocessor starts a READ OPERATION towards the memory by activating status bus S0–2 (440), for a read operation and puts the address of the transmit buffer of the memory (210) on the address busses AD0–7 and A8–16. Along with this address, the lower_chip_select signal is activated on lead (106).

Only bus controller (130) has its chip_enable pin –CE activated through inverter (180). Therefore, it decodes the status bus S0–2 from bus (440) and activates both the address_strobe signal ALE on lead (131) and the write signal –WR on lead (430). As is previously mentioned, the lower address of the transmit buffer of the memory (210) is latched into latch (120) on the falling edge of the address_strobe signal as the NOR gate (190) is connected upward its strobe pin. Therefore, the memory (210) receives a steady address bus (400) on its right_address pin RA0–16.

As the memory receives the active lower_chip_select signal on lead (106) and the read signal on lead (420), the content of the memory location is put on the data bus (410). Microprocessor (100) reads the data on the rising edge of the read signal on lead (430).

The read operation is then completed, microprocessor (100) deactivates its status bus S0–2 (440) and removes the transmit buffer address which in turn deactivates the lower_chip_select signal received by the memory (210) on lead (106).

This microprocessor starts a WRITE OPERATION towards the SCC chip by activating status bus S0–2 (440) for a write operation and puts the address of the transmit bytes FIFO onto the address busses AD0–7 and A8–16. Along with this address, the peripheral_chip_select signal to the SCC_chip is activated on lead (105). The status bus S0–2 is received by both the bus controllers (130,140) and the bus arbiter (150), but only bus controller (130) is selected. This is achieved because bus controller (130) receives through the inverter (180) the system_bus_memory_chip_enable signal on lead (109) which is not activated by microprocessor (100). The multiplexed address data bus referred as AD0–7 remains on the bus for a clock period. During that time, bus controller (130) activates the address strobe signal ALE on lead (131) and the write signal –WR on lead (430). The address of the transmit_byte FIFO is latched into latch (120) on the falling edge of the strobe signal through the NOR gate (190). Thus, the SCC chip receives a steady address on its address bus (400) during the write cycle. The SCC chip only uses the eight lowest bits of the address bus (400). On the detection of the peripheral_chip_select signal on lead (105) and the write signal on lead (430), the SCC chip (220) stores the contents of data bus (410) into its internal transmit_byte FIFO.

The write operation is then completed and microprocessor (100) deactivates its status bus S0–2 and removes the address of the transmit_byte FIFO which in turn deactivates the peripheral_chip_select signal lead (105) received by the SCC chip (220).

Both consecutive read/write operations occur for each byte of the frame transmitted by the SCC chip onto the network links. At the end of the frame transmission, the SCC chip generates an interrupt to the microprocessor.

Functional Description of the Arbiter of the System Bus (300)

FIG. 8 describes the functional description of the arbiter (380) which is a state machine clocked by the oscillator (390). It receives a request signal from the OR gate (370) and request signals REQ0 to REQ3 from the four slots, generates acknowledge signals ACK0 to ACK3 to the four slots and is composed of 8 states (state0 to state7).

At state0, the arbiter is reset and it goes to state1 when it receives a request signal from the OR gate (370). Afterwards, it will test in cascade the four request signals at state 1, 3, 5 and 7 and goes to the different states 2, 4 and 6 according to the result of the test.

At state1, it tests the REQ0 signal. In case the request signal is issued from slot0 (REQ0=1), it goes to state2 and is kept at this state2 as long as REQ0 signal is enabled; and during this state2, the acknowledge signal ACK0 is kept enabled. The arbiter returns to state0 when the request signal REQ0 is disabled by the slot0.

If the request signal is not issued from slot0, it goes to state3 at which state it tests the REQ1 signal. In case the request signal is issued from slot1 (REQ1=1), it goes to state4 and is kept at this state4 as long as REQ1 signal is enabled; and during this state4, the acknowledge signal ACK1 is kept enabled. It returns to state0 only when the request signal REQ1 is disabled by slot1.

Conversely, the state machine tests the request signals REQ2 at state5 to goes to state6 in case the request signal is issued from slot2. The same thing occurs for the test of the request signals REQ3 at state7.

Memory Map Description

Figure 9:
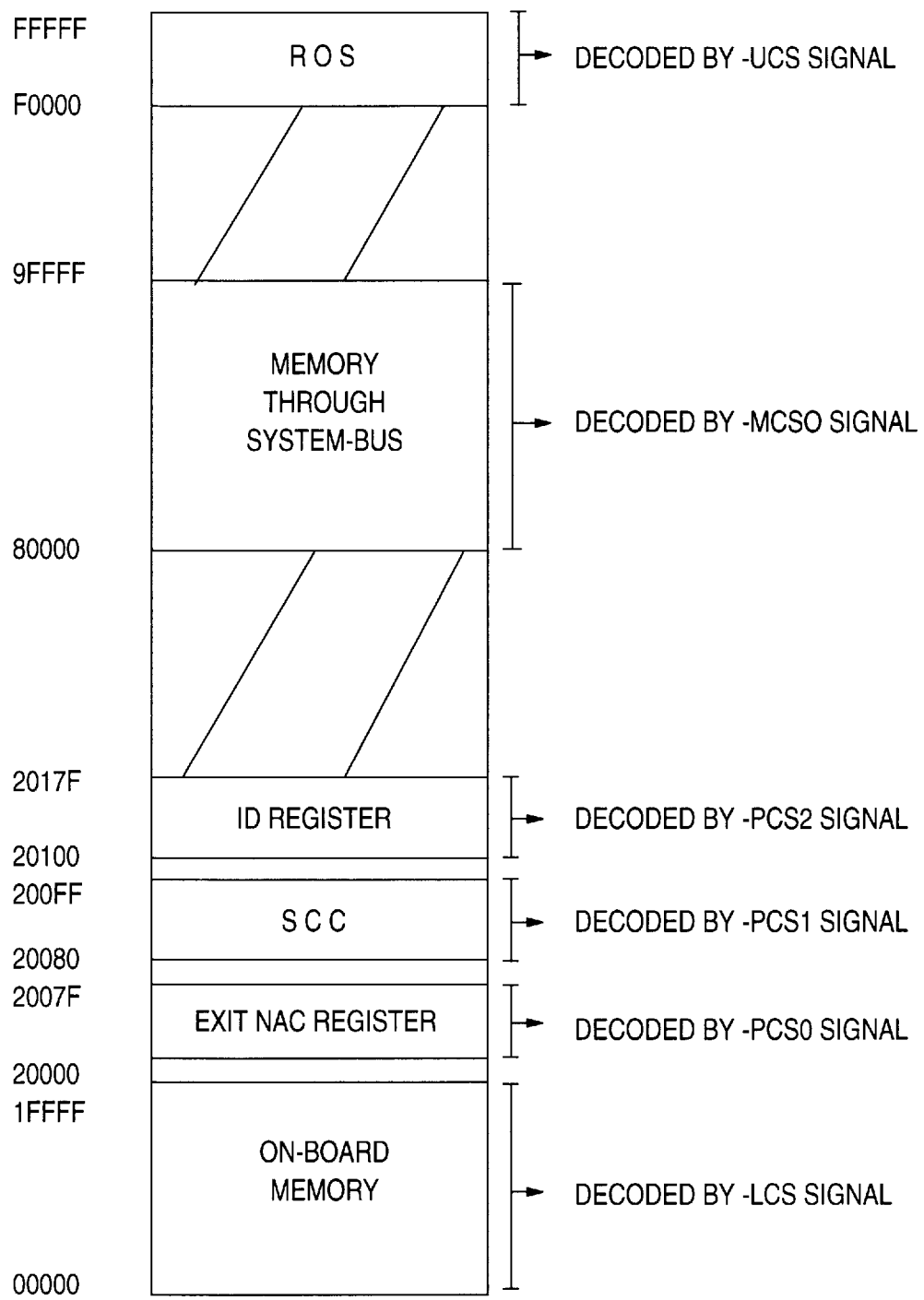
FIG. 9 shows an example of a microprocessor memory map used in each NAC.

FIG. 9 shows the microprocessor memory map used in each NAC and which comprises 6 fields. A first range from 00000 to 1FFFF addresses the on-board dual port memory and is decoded by the lower_chip_select signal LCS on lead (106). A second range from 20000 to 2007F addresses the Output NAC register and is decoded by the peripheral_chip_select signal PCS0 on lead (107). A third range from 20080 to 200FF addresses the SCC chip and is decoded by the peripheral_chip_select signal PCS1 on lead (105). A fourth range from 20100 to 2017F addresses the ID register and is decoded by the peripheral_chip_select signal PCS2 on lead (101). Range from 20180 to 7FFFF is not used. A fifth range from 80000 to 9FFFF addresses the memory accessible through the system bus (300) and decoded by the system_bus_memory_chip_select signal –MCS0 on lead (109). Range from A0000 to EFFFF is not used. And finally a sixth range from F0000 to FFFFF addresses the ROS (read only storage) and is decoded by the upper chip select signal UCS on lead (108).

Example to illustrate the routing algorithm as used in the present invention.

FIGS. 15 and 16 gives an example of how to use the network parameters and how to settle the table of routing identifiers using the routing algorithm. This table of routing identifiers gathers the network tables of all terminals.

Let us take a communication network, as shown in FIG. 4, whose network nodes are numbered as node1=13, node2=7 and node3=11. These numbers have to be prime numbers and higher than the numbering of the NACs in each node as is already said in the routing algorithm description. FIG. 15 gives the address numbers of the five NACs in the three nodes according to which in node1, the five NACs of node1 are as follows (NAC1=0, NAC2=1, NAC3=2, NAC4=4, NAC5=5), the five NACs of node2 are as follows (NAC1=1, NAC2=3, NAC3=0, NAC4=2, NAC5=4), and the five NACs of node3 are as follows (NAC1=0, NAC2=1, NAC=4, NAC4=2, NAC5=3).

According to this numbering the 9 terminals which are connected to the different NACs have the numbering as is shown in FIG. 16. In this figure, there are direct numbers and alternate numbers used in case the frame comes from the other way round from the other node. Therefore, owing to this numbering, each time a frame is sent from a source terminal, the destination terminal is to be found according the routing algorithm by the division which is already mentioned.

The example given in FIGS. 15 and 16 can be generalized to a number N.

On the assumption terminal T1 wants to send a frame to terminal T7 using the direct route (Node1–Node3), RI=69, then the following steps are performed:

1. T1 sends a frame referenced as F1 containing a flag, a RI, bytes of data and a CRC. Said frame is then received by node1 and more precisely by the input port NAC1 and stored in NAC1 memory.
2. NAC1 processor computes the algorithm to find the exit NAC. In our example: 69/13=5 and the remainder is equal to 4. Therefore, the address of the exit NAC is 4 and its name is NAC4.
3. The frame F1 is transferred from NAC1 memory to NAC4 memory in a peer to peer communication protocol.
4. NAC4 processor along with its SCC chip sends out on the network link the F1 frame which is received by an input port NAC2 of node3 and stored in NAC2 memory.
5. NAC2 processor computes the algorithm to find the output port. In this example, 69/11=6 and the remainder is 3. Therefore, the address of output port (or exit NAC) is 3 which is then NAC5.
6. Frame F1 is transferred from NAC2 memory to NAC5 memory in a peer to peer communication protocol.
7. NAC5 processor along with its SCC chip sends out on the network link the frame F1 which is then received by the destination terminal T7.

We claim:

1. A method of routing a frame including a field containing a routing identifier, emitted by a source terminal connected to an input port of a first node to a destination terminal connected to an output port of a second node, in a communication network comprising a plurality of interconnected nodes, each having at least one input and one output ports; said routing method comprising the steps of:

(a) building at said source terminal a network table comprising at least a routing identifier to be imbedded in said emitted frame, said routing identifier being determined according to nodes and ports addresses through which said frame will pass to reach said destination terminal wherein each node in said network is identified with a different node address that is a Prime Integer higher than the highest port address in the node and each port in each node is identified with a different port address that is an integer; and (b) at each node including said first and second nodes, directing said frame incoming on an input port to an output port wherein the address of said output port is the remainder of the division of the routing identifier of the incoming frame by the node address.

2. The routing method of claim 1 characterized in that the network table is built by iteratively from node to node computing each routing identifier so that the remainder of the division of said routing identifier by the current node address corresponds to the address of the output port of each node according to at least three parameters that are the number of nodes passed by said frame between the source and destination terminals, said passed nodes addresses and the exit port of each of said passed nodes.

3. The method of any one of claims 1 or 2 wherein the network table contains at least an alternate routing identifier corresponding to other nodes being passed by said frame to reach said destination terminal.

4. The method of claim 3 wherein a timer is implemented at said source terminal and is started when said frame is emitted, in order to re-emit said frame with an alternate routing identifier when said timer expires.

5. The method of claim 1 wherein the same network table (FIG. 16) is stored in each terminal connected to the communication network, comprising routing identifiers to be imbedded in frames from any terminal to any other terminal connected to the network.

6. The method of claim 5 comprising updating said network table each time a terminal and/or network node is added to or cancelled from said network.

7. A communication network comprising:
a plurality of interconnected nodes, each having at least one input and one output ports, each node in said network having a different node address that is a crime integer higher than the highest port address in the associated node and each port in each node being associated with a different port address that is an integer;
at least a source terminal connected to an input port of a first node and emitting a frame including a field containing a routing identifier, to a destination terminal connected to an output port of a second node;
means for routing said frame from said source terminal to said destination terminal, including:
means in said communication network for building at said source terminal a network table comprising at least a routing identifier to be imbedded in said emitted frame, said routing identifier being determined according to the number of nodes, nodes and ports addresses through which said frame will pass to reach said destination terminal,
means in said source terminal for storing said network table, and
means in each of said nodes for directing said frame incoming on an input port to an output port, the address of said output port being the remainder of the division of the routing identifier of the incoming frame by the node address.

8. The communication network of claim 7 characterized in that said directing means comprises a system bus (300) associated to an arbiter (380) and a system bus controller (140,150,310,320,330,340) and comprises registers (360) respectively storing port and node addresses, a memory (210) storing data bytes, a processor (100) and a chip (220) for performing the read/write operations into said memory (210).

9. The communication network of claim 7 wherein the network table further includes at least one alternate routing identifier relating to other nodes being passed by said frame to reach said destination terminal.

10. The communication network of any one of claims 7 or 9 further comprising at said source terminal a timer being started when said frame is emitted, and means to re-emit said frame with an alternate routing identifier when said timer expires.

11. In a communications network having a plurality of interconnected nodes with each node having Network Attachment Cards (NACs) for coupling source terminals to each node, a routing method comprising the steps of:
receiving, on an input port, in a NAC from a source terminal a frame to be forwarded to a destination terminal; said frame having routing identifier (RI) being determined according to at least one node address and at least one port address through which said frame will be routed, wherein said at least one node address is a Prime Integer and said at least one port address is an integer;
determining an address for an output port to which said frame is to be routed, with said address for the output port being a remainder of a division of the RI in the frame and a node address; and
forwarding said frame to the address for the output port.

12. A Network Adapter Card for use in a communications network comprising:
means for receiving from a source terminal a frame to be forwarded to a destination terminal, said frame having an RI being determined according to node addresses and port addresses through which said frame will be routed, wherein each of the node addresses is a Prime Integer and each of the port address is an integer;
calculating apparatus for determining an address for an output port to which said frame is to be routed, with said address being a remainder of a division of the RI in the frame and a node address; and
means for forwarding said frame to the address for the output port.

13. In a communications network having a plurality of interconnected nodes with each node having Network Attachment Cards (NACs) for coupling source terminals to said each node, a routing method comprising the steps of:
generating at least one Routing Table in at least one of the source terminals, said at least one routing table including at least one entry of at least a first RI; that is calculated from an expression dependent on number of node through which a message has to be transmitted, address of the node and address of a Network Attachment Card, NAC;
generating a message including the RI expression;
and forwarding the message to a Network Attachment Card.

14. The routing method of claim 13 wherein the node address is a Prime Integer and the NAC address is an integer.

15. The routing method of claims 13 or 14 further including the steps of, for each NAC receiving a message, dividing the RI by the address of the node; and
forwarding said message to a Network Attachment Card having an address similar to a remainder.

16. The routing method of claims 13 or 14 further including the steps of providing alternate RI in said routing table.

* * * * *

UNITED STATES PATENT AND TRADEMARK OFFICE
CERTIFICATE OF CORRECTION

PATENT NO. : 5,771,227
DATED : June 23, 1998
INVENTOR(S) : Benayoun, et. al.

It is certified that error appears in the above-identified patent and that said Letters Patent is hereby corrected as shown below:

Title page, item [54] and col. 1, line 2, change "MASSAGES" to --MESSAGES --

Signed and Sealed this

Seventeenth Day of November, 1998

Attest:

BRUCE LEHMAN

Attesting Officer

Commissioner of Patents and Trademarks